United States Patent [19]

Bartram

[11] Patent Number: 5,465,395
[45] Date of Patent: Nov. 7, 1995

[54] COMMUNICATION VIA LEAKY CABLES

[76] Inventor: David V. Bartram, 32 Quenby Way, Bromham, Bedford MK43 8QU, England

[21] Appl. No.: 187,817

[22] Filed: Jan. 27, 1994

Related U.S. Application Data

[63] Continuation of Ser. No. 944,801, Sep. 14, 1992, abandoned, which is a continuation of Ser. No. 689,013, Apr. 22, 1991, abandoned.

[51] Int. Cl.⁶ .............................. H04B 7/26; H01P 3/06
[52] U.S. Cl. .................... 455/55.1; 333/237; 343/791
[58] Field of Search ...................... 455/55.1; 174/102 R, 174/102 SP, 106 R; 343/770, 790, 791, 873; 333/237

[56] References Cited

U.S. PATENT DOCUMENTS 3,916,311  10/1975  Martin et al. ............................. 455/41
4,129,841  12/1978  Hildebrand et al. ..................... 333/237
4,339,733   7/1982  Smith ....................................... 333/237
4,480,255  10/1984  Davidson ................................. 343/791

OTHER PUBLICATIONS

Bosshard, Radio Links for Mighway Tunnels, 1979, 14 and 15.

Primary Examiner—Edward F. Urban
Assistant Examiner—Chi H. Pham
Attorney, Agent, or Firm—Iandiorio & Teska

[57]  ABSTRACT

A communication system that utilises leaky feeder cables (1) has a ruggedised tubular housing (8). The housing is preferably made of stainless steel, and to enable ingress and egress of signals the housing is provided with discontinuities. The discontinuities are preferably arranged to establish a regular pattern on the signals.

5 Claims, 5 Drawing Sheets

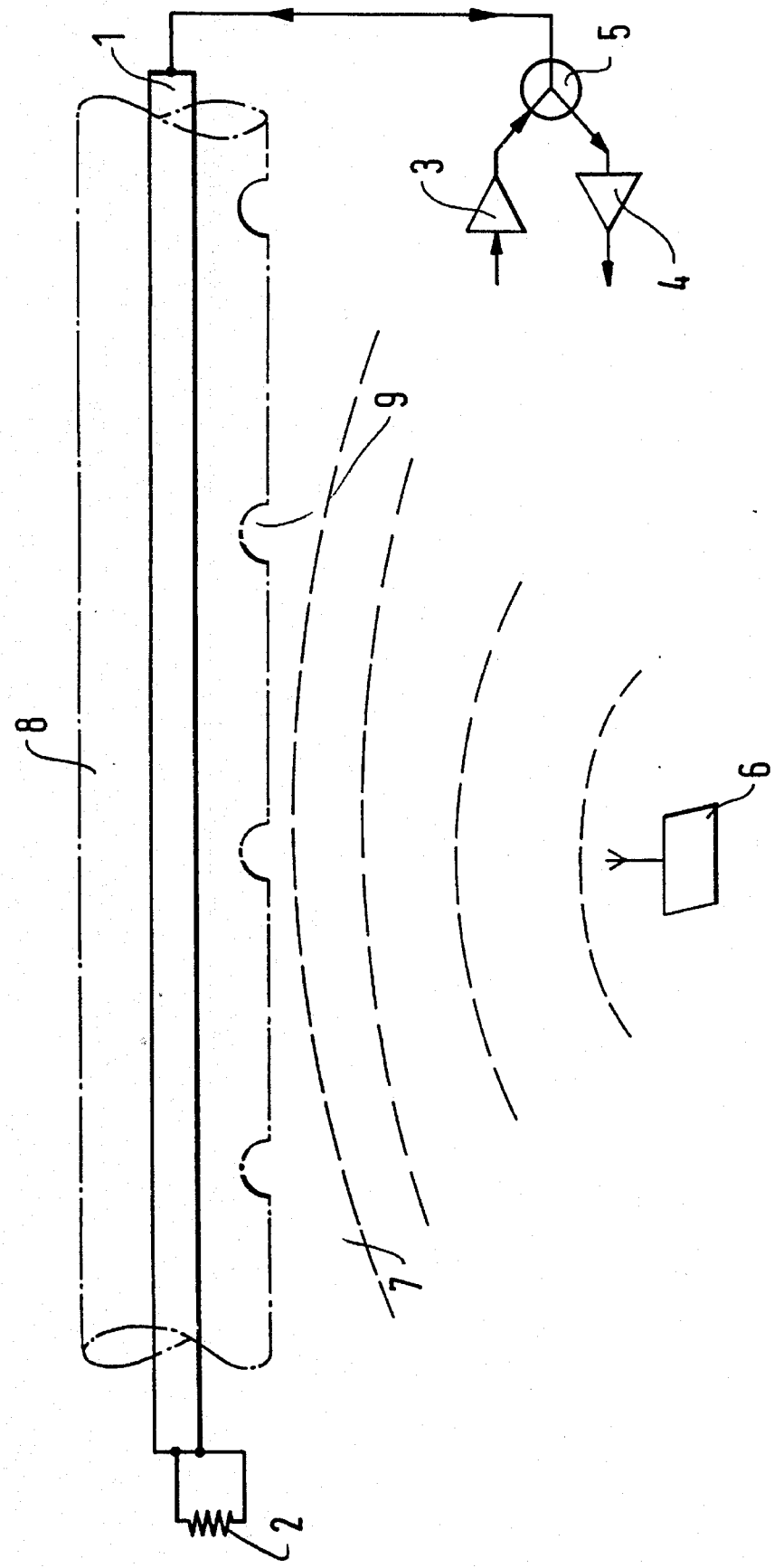

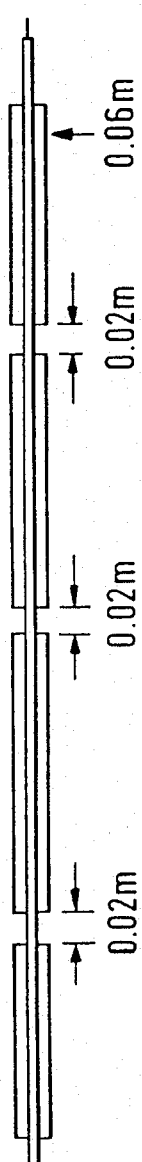
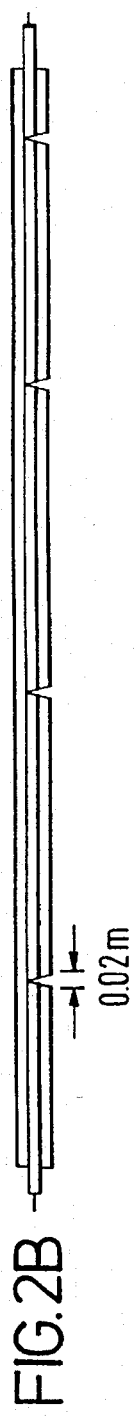
FIG.2A  FIG.2A-1
FIG.2B  FIG.2B-1
FIG.2C  FIG.2C-1
FIG.2D  FIG.2D-1

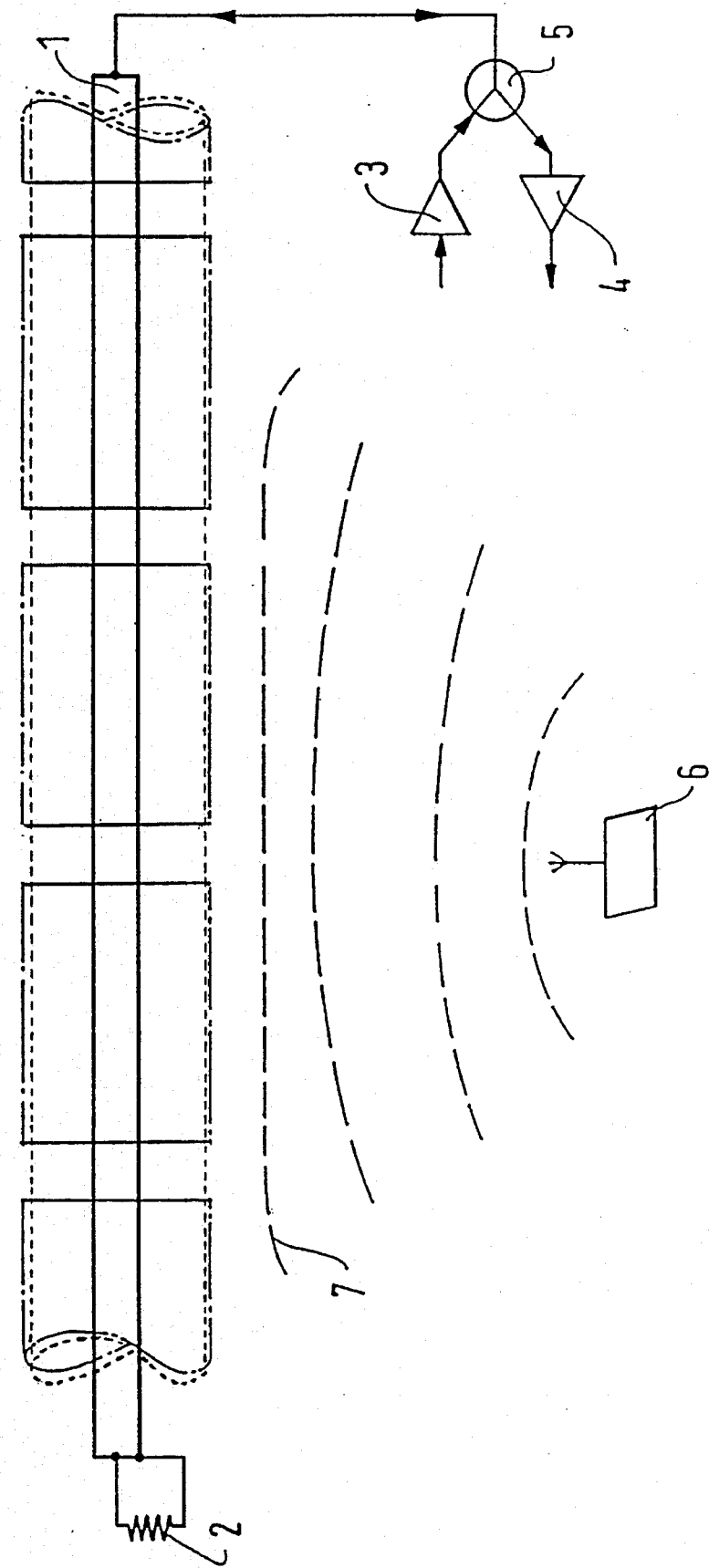

COMMUNICATION VIA LEAKY CABLES

This is a continuation of application Ser. No. 07/944,801 filed Sep. 14, 1992 now abandoned which is a continuation of Ser. No. 07/689,013, filed Apr. 22, 1991 now abandoned.

FIELD OF THE INVENTION

This invention relates to communications systems and in particular but not exclusively to communication systems in which leaky cables are utilised to enhance communication with a mobile transmitter or receiver.

BACKGROUND OF THE INVENTION

There are various environments such as large buildings or industrial works, docks, mines, airports, railways, tunnels and so forth where communication between a base station and mobile vehicles or personnel ('mobiles') or between two mobiles is necessary. Full radio communication using significant power broadcasting presents problems in some environments due to potential hazard and in others, in terms of channel availability and regulatory conditions. More serious difficulties are encountered when wideband signals such as video signals are to be transmitted; and are aggravated by changes in geometry. It is known to provide distributed low power transmission from or reception by a leaky feeder cable which extends from a base station. A leaky feeder cable of the known type comprises a coaxial cable which has deliberately imperfect screening.

One problem that arises in a variety of circumstances is a need to shield the feeder physically while permitting propagation in the manner of a leaky feeder and particularly to enable servicing of the feeder for very long periods of time.

SUMMARY OF THE INVENTION

The present invention provides a transmission system comprising a feeder cable disposed within a housing that provides discontinuous RF shielding in which the discontinuous RF shielding comprises a plurality of intervals in the screening arranged to define a pattern on transmitted or incident RF signals.

DISCLOSURE OF PREFERRED EMBODIMENTS

The invention is now described by way of example with reference to the accompanying drawings in which:

FIG. 1 is a schematic drawing of an installation according to an embodiment of the invention;

FIG. 2 shows alternative embodiments of tube housings;

FIG. 7 illustrates the housing of this invention with shielding material shown in phantom.

Figure 3:
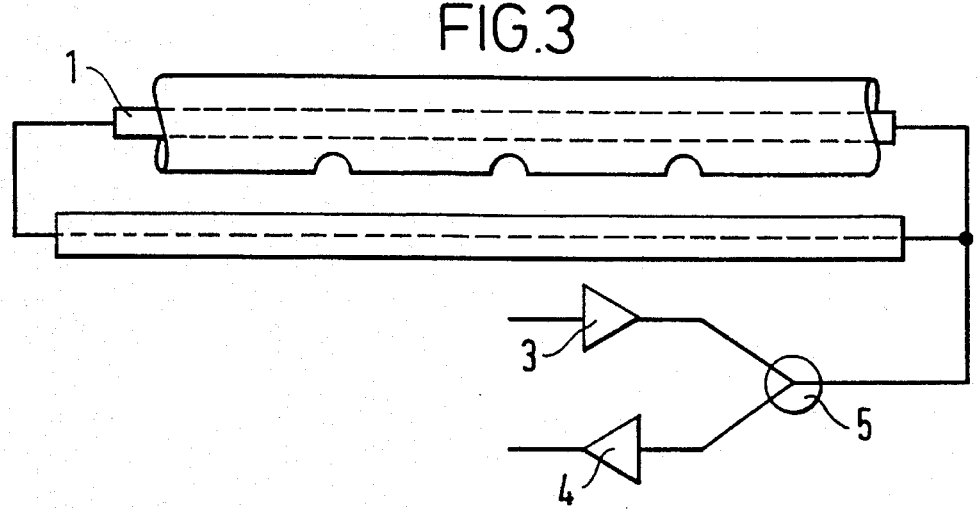
FIG. 3 is an embodiment for enhancing received signals.

in buildings or sites communication between a base and a vehicle may be required not only for voice but also for remote control and in many instances communication in both directions is required although not necessarily always of the same type of signals. For example in robotic systems such as in warehouses directional instructions are transmitted to the robot and video and/or other positioning signals may be transmitted back from the robot to the remote operator. Frequently the remote operator will be located at a base station, but in some instances may also be mobile. Thus two way communcation is desirable both between stations and mobiles and between mobiles.

Referring now to FIG. 1, a schematic embodiment of the invention shows a leaky feeder cable 1 that is connected to a terminating resistance 2. Signals are launched into the feeder cable 1 from a transmitter 3, and signals in the cable are picked up by a receiver 4. The transmitter 3 and receiver 4 are connected to the cable and isolated from each other by a directional coupler, which may be a low-loss frequency sensitive coupler 5. Typically the transmitted data comprises low bandwidth control data at 25 KHz on a 30 MHz carrier. With a leaky feeder cable externally generated RF radiation will penetrate the imperfect screening at the cable and then propagate in the cable both directions, and this can be utilised to receive from an external mobile, such as mobile 6.

However, a typical rate of propagation in cable is 0.8 times the free space velocity, thus a signal such as a video picture at normal TV rates on a substantially plane wavefront 7 that impinges on a leaky cable 1 over a distance of say 6 meters will suffer multi-path distortion, in the example of a video picture blurring it over 100 ns and reducing the line resolution by a factor of 2.

In the present invention it is proposed to provide an additional component comprising a member such as a metal tube 8 having spaced apart apertures 9. Where the tube is solid it acts as an RF screen preventing both egress and entry of radiation, but at the apertures radiation leaked from cable 1 is emitted as if from a series of point sources, and likewise impinging external radiation enters the cable only in the vicinity of the apertures.

The effect of the radiation being transmitted from a series of apertures rather than along a continuous length is of negligible effect in that the apertures, over the route of the leaky feeder cable, effectively constitute a near randomly distributed pattern of secondary sources. Very close to the tube (i.e. within a few centimeters) there may be voids in the transmitted signals, but this can be overcome by providing spaced apart multiple antennae for reception at the mobile.

With respect to the externally generated radiation the effect of the apertured tube is of more significance. In this instance the image blurring is quantised into periodic time-delayed elements, instead of a continuum of blurring, and this periodic blurring can be removed by adaptive filter techniques. The particular spacing and arrangement of the apertures can be selected to suit the filtering arrangement. The use of an apertured tube in this way is significantly less expensive and less complex than the alternative of installation of directional transmission antennae on to the mobile stations. Additionally, the metal tubing has the practical advantage of providing a rugged housing for the feeder cable.

The apertured tube illustrated in FIG. 1 could be replaced by alternative structures, the basic concept being to provide an RF shield with interruptions or discontinuities at particular intervals. FIG. 2 shows some alternative exemplary structures: (a) a series of discrete tubes, for example 6 meter lengths separated by a 0.02 meter interval. Such a tube may be fabricated with the discontinuities of RF transparent material so as to maintain continuous ruggedisation, or be a continuous RF transparent tube with areas of an RF shielding, coating or sheathing, FIG. 7. FIG. 2(b) illustrates a notched tube, with 0.02 m width notches at intervals of 2 to 12 meters along the tube. Square or other cross-sections of tubes may also be used such as those shown in FIGS. 2B and 2C.

An important advantage of the present invention is that the tube, which may be, for example, of stainless steel, provides physical protection for the cable and yet does not significantly impair propagation of signals to or from the cable. Moreover, the invention allows for long-term servicing of the cable. In particular the tube may extend around a region in which are deployed mobile transmitters and/or receivers, such as may be incorporated in remotely operated vehicles. The cable may be withdrawn from the sheath or tube for inspection or replacement. A new cable may be inserted into the sheath or tube without any need for human entry into the region around or in which the sheath or tube extends.

When an externally generated signal enters the cable 1 it divides and propagates in opposite directions. With the arrangement shown in FIG. 1, the far end of the leaky feeder is terminated in a load to minimise distortion from reflected signals returning back along the cable. An alternative embodiment is shown in FIG. 3, in which the end of the leaky feeder is connected to a low loss coaxial cable (which could of course be a continuation of the same cable but with full rather than leaky sheathing) and the low loss coaxial cable is then connected back to the base station, so that the signals in the low loss cable are combined with the signals that propagated along the leaky cable. In this way the signal strength can be improved at the receiver which, instead of receiving from only half of the input energy transmitted along a leaky cable, also receives signals that propagated in the opposite direction. Such an arrangement may further minimise the risk of voids as well as signal loss in the effective field pattern.

Figure 4:
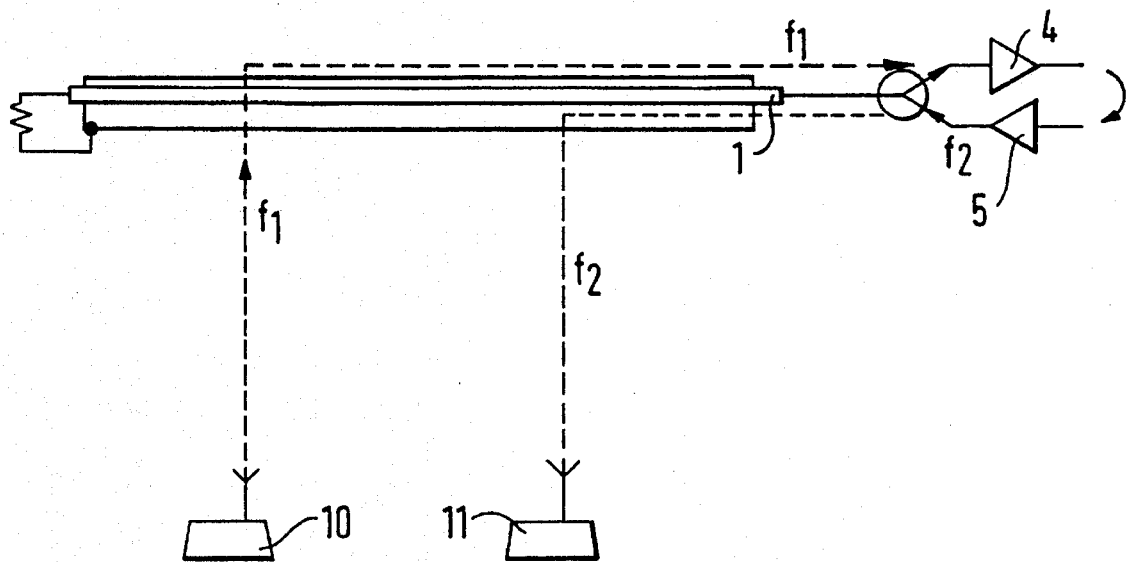
FIG. 4 illustrates mobile to mobile communication.

Mobile station to mobile station communication may be achieved by the technique illustrated in FIG. 4.

In FIG. 4 a first mobile station 10 transmits a signal f, that is picked up by the leaky cable 1 in apertured tube 8. This signal is passed by the leaky cable to the receiver 4 where it is amplified, passed to transmitter 5 and retransmitted as signal $f_2$ along the leaky cable. It can then be picked up by any other appropriately tuned mobile such as mobile 11.

Figure 5:
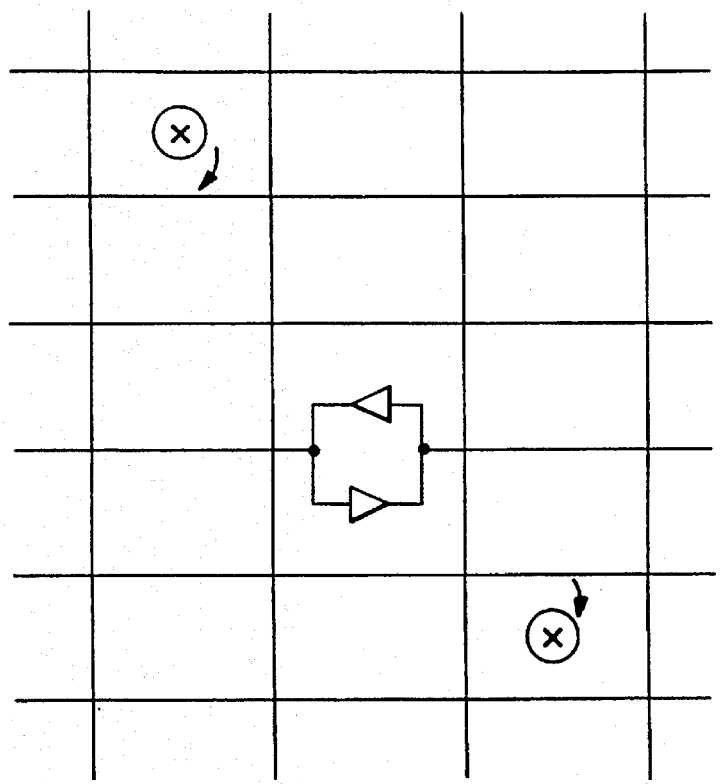
FIG. 5 illustrates an embodiment utilising a network of leaky cables.

In FIG. 5 a mesh network is illustrated. Such an arrangement, incorporating the discontinuously shielded leaky cable, may be utilised in buildings or large vehicles or vessels. The leaky cables define a network of local cells coupled together and communicating with transmitters and receivers. Such an arrangement may be utilised to provide mobile to mobile communication without the attendant propagation delay and attenuation associated with remote base stations.

Figure 6:
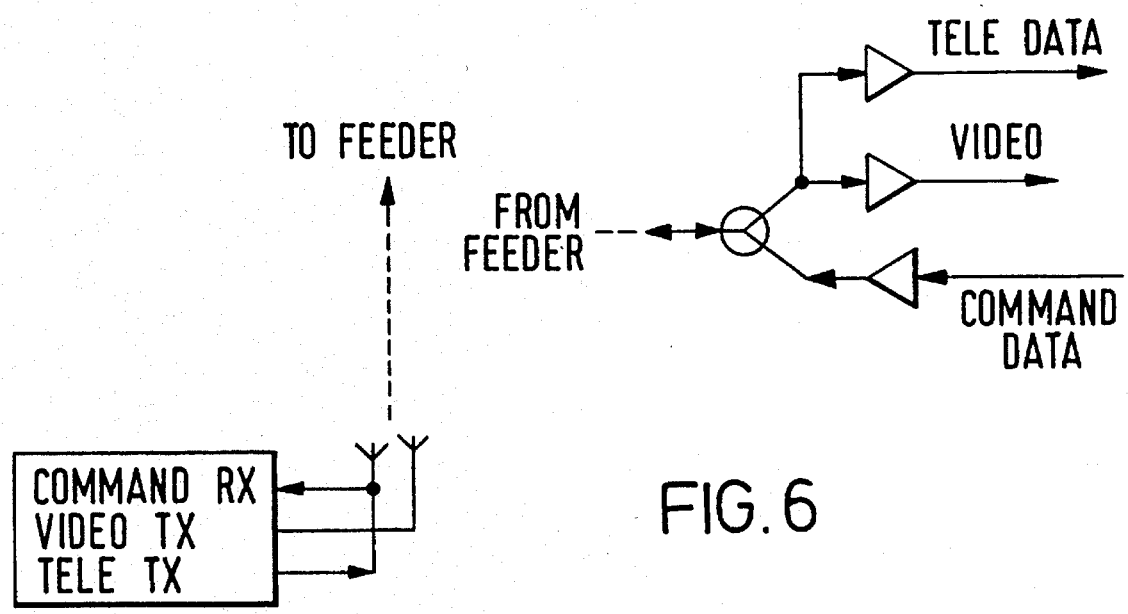
FIG. 6 illustrates a typical single station arrangement configured for a mobile vehicle controlled from a base station.

FIG. 6 schematically illustrates a one station arrangement configured for a mobile vehicle controlled from a base station. One or more video channels may be transmitted at UHF or higher frequencies from mobile to the cable. Telemetry data from the vehicle may be combined with video signals or, more preferably, separately transmitted. Command data is sent from.

A modification of the invention would be to establish discrete discontinuities (or zones of imperfect screening) in the screening of the cable with 'perfect' screening between the discontinuities so that the leak pattern from the cable itself adopted the pattern described in relation to the tube.

I claim:

1. A wide band RF mobile communication system comprising:

at least one mobile station;

a continuous installation duct;

a coaxial leaky feeder cable acting as a transmitting and receiving antenna for RF signals;

the installation duct comprising a continuous rugged tube with the leaky feeder cable disposed longitudinally in loosely spaced relationship within the installation duct and withdrawable for inspection and replacement, and in which the duct comprises substantially perfect RF screening material with relatively widely spaced discontinuities enabling egress and entry of wideband RF radiation to and from said coaxial leaky feeder cable, the discontinuities being disposed to define a filterable pattern on RF radiation incident upon the leaky feeder cable.

2. The wideband RF mobile communication system of claim 1 in which said discontinuities in the duct are 0.02 meters in length.

3. The wideband RF mobile communication system of claim 1 in which said discontinuities in the duct are arranged in a regular pattern to impose time delay periodicity on signals received by the leaky feeder via individual discontinuities.

4. The wideband RF mobile communication system of claim 1 in which one end of said leaky feeder cable is connected to a transmitter and the other end is connected via a low loss cable to a receiver.

5. The wideband RF mobile communication system of claim 1 in which said discontinuities comprise apertures in the duct.

* * * * *